(12) United States Patent
Trinler et al.

(10) Patent No.: US 7,311,337 B2
(45) Date of Patent: Dec. 25, 2007

(54) HOUSING STRUCTURE

(75) Inventors: Martin Trinler, Hockenheim (DE); Sascha Wendel, Schoenau (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/958,055

(22) Filed: Oct. 4, 2004

(65) Prior Publication Data

US 2005/0189760 A1    Sep. 1, 2005

(30) Foreign Application Priority Data

Feb. 27, 2004  (DE) .................. 10 2004 010 148

(51) Int. Cl.
*F16L 55/00* (2006.01)
(52) U.S. Cl. .................. 285/13; 285/190; 285/124.1
(58) Field of Classification Search ...... 138/89.1–89.4, 138/91; 285/901, 120.1, 124.1, 124.2, 124.4, 285/13, 14, 900
See application file for complete search history.

(56) References Cited

U.S. PATENT DOCUMENTS 3,333,598 A * 8/1967 Schott .................. 285/190
3,860,269 A * 1/1975 Horton et al. ........... 285/124.1
4,481,977 A   11/1984 Maldavs

FOREIGN PATENT DOCUMENTS

DE   90 10 316    7/1990
DE   196 15 893   4/1996

OTHER PUBLICATIONS

ISO 7241-1, First Edition, Apr. 1, 1987, Hydraulic Fluid Power-Quick Action Couplings-Part 1: Dimensions and Requirements, 8 Pages.

* cited by examiner

*Primary Examiner*—Aaron Dunwoody

(57) ABSTRACT

A housing structure is provided having at least two housing sections each provided for covering and/or closing a hydraulic coupling, particularly for dust protection. A first hydraulic coupling is disposed above a second hydraulic coupling, preferably in a vehicle or tool, such as a commercial agricultural or industrial vehicle. A housing section has an opening that is reversibly sealable with a closing element and through which a counterpart of a hydraulic coupling can be inserted to create a hydraulic connection. The housing structure has an area disposed below for collecting leaking fluid. Retaining means are provided for each reversibly sealable opening by which the escape of leaking fluid from the respective opening is largely preventable. Wetting of the hydraulic coupling with leaking fluid and the escape of leaking fluid from the opening of the housing structure is avoided by simple structural means. The housing structure has conveying means by which the leaking fluid escaping from the upper hydraulic coupling can be conveyed at least for the most part to an area for collecting leaking fluid.

9 Claims, 2 Drawing Sheets

HOUSING STRUCTURE

FIELD OF THE INVENTION

The invention relates to a housing structure having at least two housing sections. The housing sections are each provided for covering and/or sealing a hydraulic coupling, in particular for protection from dust. A first hydraulic coupling in the operating state is disposed above a second hydraulic coupling, preferably on a vehicle or tool, particularly on a commercial agricultural or industrial vehicle. A housing section has an opening that is reversibly sealable with a closing element and through which a counterpart of a hydraulic coupling can be inserted to create a hydraulic connection. The housing structure in the operating state has an area disposed below for collecting leaking fluid. A retaining means is provided for each reversibly sealable opening, provided for the purpose of connection, said means by which the escape of leaking fluid from the respective opening is at least largely preventable.

BACKGROUND OF THE INVENTION

Commercial agricultural and industrial vehicles, particularly farm tractors, are typically equipped with hydraulic connecting couplings, hereinafter hydraulic couplings, so that external hydraulic motors and/or hydraulic cylinders can be connected and run by means of the hydraulic system of the vehicle. According to ISO 7241-1, typically about 5 ccm of hydraulic fluid or hydraulic oil, hereinafter leaking fluid, escapes during quick-release coupling in current hydraulic couplings.

Accordingly, such hydraulic couplings, often formed as hydraulic quick couplings, must be protected from moisture and soiling. It is known in the art for this purpose to provide for each hydraulic quick-release connector a dust housing hereinafter a housing structure, by means of which the leaking oil is caught and collected through a hose into a collecting container. This type of dust housing is known, for example, from U.S. Pat. No. 4,481,977 and typically comprises for each hydraulic coupling a sealable opening through which a counterpart to a hydraulic coupling can be inserted to finally create a hydraulic connection between the vehicle and a hydraulic user.

Currently, two hydraulic couplings are typically provided for a hydraulic user, one through which a hydraulic fluid is conveyed from the vehicle to the user, and a second hydraulic coupling through which the hydraulic fluid is returned to the vehicle. These two hydraulic couplings are usually disposed one above the other on a vehicle or tool and surrounded at least in part by a mutual dust housing or otherwise protected from soiling. In this case, the leaking fluid escaping from the top hydraulic coupling is conducted through a connecting line to the dust housing in such a manner that the lower hydraulic coupling is wetted by the leaking fluid and/or can escape from the lower opening of the dust housing. Despite sealing elements for the openings, this leads to extensive soiling of the hydraulic couplings in the dust housing and of the dust housing by the adhering dust, particularly in agricultural applications. Dirty hydraulic couplings in the coupled state can lead to leaks, which in the worst case can cause the failure of the tool and in the loss of a considerable amount of hydraulic fluid.

Accordingly, there is a clear need in the art for the provision and improvement of a housing structure of the aforementioned type by means of which the aforementioned problems are overcome.

SUMMARY OF THE INVENTION

In view of the foregoing, it is an object of the invention to avoid wetting of a hydraulic coupling with leaking fluid and the escape of leaking fluid from the opening of the housing structure by simple structural means.

As taught by the invention, a housing structure of the aforementioned type is characterized in that a means is provided by which the leaking fluid, which escapes from the upper hydraulic coupling and is located in the housing section allocated to said hydraulic coupling, can be conveyed for the most part into the area for collecting leaking fluid. By this means, the leaking fluid can be prevented in an especially advantageous manner, from wetting the lower hydraulic coupling and from escaping from the opening of the lower housing section.

In a preferred embodiment, the retaining means and/or the conveying means have an inwardly directed projection, provided in the housing section. Typically, the interior area of the housing section is formed in the shape of a cylinder. Accordingly, the inwardly directed projection protrudes in the radial direction or projects from the inside wall. The retaining means provided in the upper housing section is preferably formed over the entire perimeter of the cylindrical interior area, so that as a result the leaking fluid present in the upper housing section cannot escape from the opening of the upper housing section.

The projection is also provided in the lower housing section with particular preference. The projection can be oriented protruding from the housing section and facing the hydraulic coupling. A groove is formed by this, said groove facing the hydraulic coupling and by which the escape of the leaking fluid from a sealable opening can be at least largely prevented.

In another embodiment, the retaining means and/or the conveying means are formed in the shape of a ring. The retaining means and/or the conveying means can be disposed in an area of the housing section near the hydraulic coupling. Thus, the leaking fluid can be conveyed immediately after its emergence from the hydraulic coupling to the area for collection without the leaking fluid entering the area of the opening of the housing section and thus, the closing element being wetted by the leaking fluid.

Very generally, the retaining means and/or the conveying means can have a groove-shaped or trough-shaped channel. Alternatively or in addition, the retaining means and/or the conveying means can have a closed channel. In a preferred embodiment, it is provided in particular that the conveying means has a channel, preferably in the form of a tubular section, by which the upper housing section can be connected to the lower housing section. This channel could be disposed centrally in the housing structure and extend from the lower area of the upper housing section to the upper area of the lower housing section.

The channel opens in the upper housing section into an area between the retaining means and the hydraulic coupling. Thereby, the leaking fluid present in the upper housing section is almost totally drained off through the channel, because the leaking fluid escaping from the upper hydraulic coupling is obstructed at the exit from the housing section by the retaining means and thus is retained or collects there.

Furthermore, it is preferably provided that the channel in the lower housing section opens into an area between the retaining means or conveying means and the hydraulic coupling. By this means as well, the leaking fluid coming from the top housing section can be directed into the area, in which the leaking fluid escaping from the lower hydraulic coupling is obstructed by the retaining means at the exit from the housing section.

Forming the housing structure as a single piece is especially preferred for a simple and cost-effective production. The housing structure, for example, could be a one-piece plastic housing, on which means of attachment for attaching the housing structure to the hydraulic couplings are provided.

The area for collecting leaking fluid is preferably connectable to a container, whereby the connection can be made by means of a hose. The container is preferably formed and/or disposed separate from the housing structure. By this means, the leaking fluid collected in the container can be disposed of from time to time according to good practice or returned to the hydraulic system.

In the case of several upper hydraulic couplings arranged side by side and several lower hydraulic couplings arranged side by side, a housing structure is provided for an upper hydraulic coupling and a hydraulic coupling disposed thereunder according to a preferred embodiment. Hereby, a housing structure can be provided for each pair of hydraulic couplings; three housing structures are mounted in vehicles with, for example, six hydraulic couplings and accordingly four housing structures in vehicles with eight hydraulic couplings. Preferably, the areas for collecting leaking fluid of the housing structures arranged side by side can be connected together, for example, by means of a T piece.

In another embodiment, a one-piece housing structure is provided for several upper hydraulic couplings arranged side by side and several lower hydraulic couplings arranged side by side. This permits an especially simple and rapid mounting of the housing structure.

In a preferred embodiment a hydraulic coupling has a quick-release connector. Preferably, this can be a hydraulic quick-release connector, which can be connected only in the pressure-free state.

The housing structure or a housing section is preferably formed to protect against dust and/or soiling in such a manner that a hydraulic coupling is surrounded at least partially by a housing section from at least one side. This is typically the side of the hydraulic coupling, which must be accessible for the connecting.

Basically, the hydraulic couplings can be disposed with their coupling ends sloping obliquely downward, whereby the servicing of the hydraulic couplings is simple, because in a farm tractor these are typically disposed at the shoulder or head height of an operator. The collecting of the leaking fluid is also promoted by the oblique position.

Preferably, a hydraulic coupling longitudinal axis forms an angle between 5 and 25 degrees with the horizontal line.

Basically, a reversibly sealable opening has a substantially circular cross section. The closing element, closing a sealable opening, could have a rubber stopper. Such rubber stoppers are already known in the art and can be produced cost-effectively in large quantities in an especially advantageous manner.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
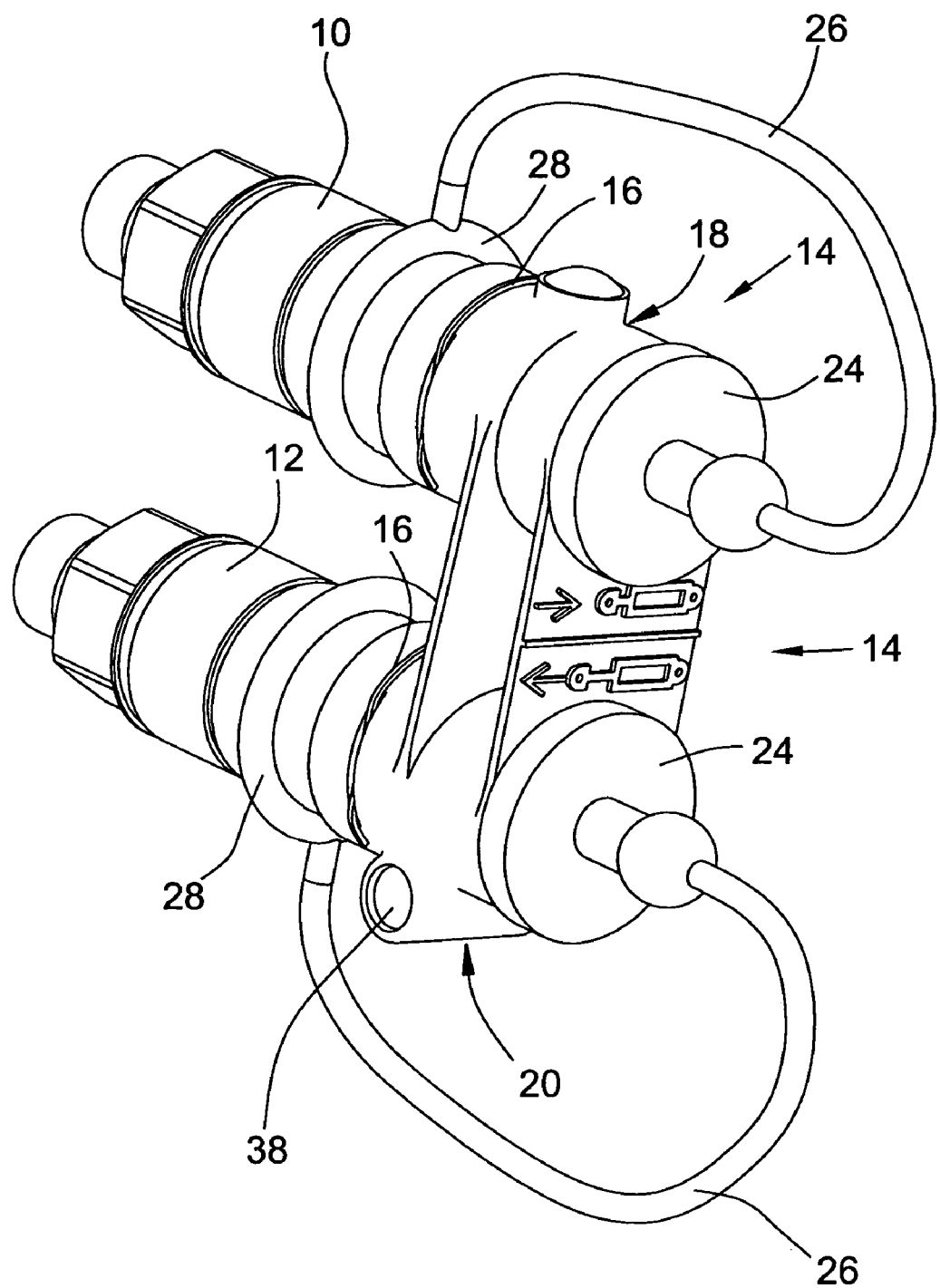
FIG. 1 is a perspective view of an exemplary embodiment of the invention.
Figure 2:
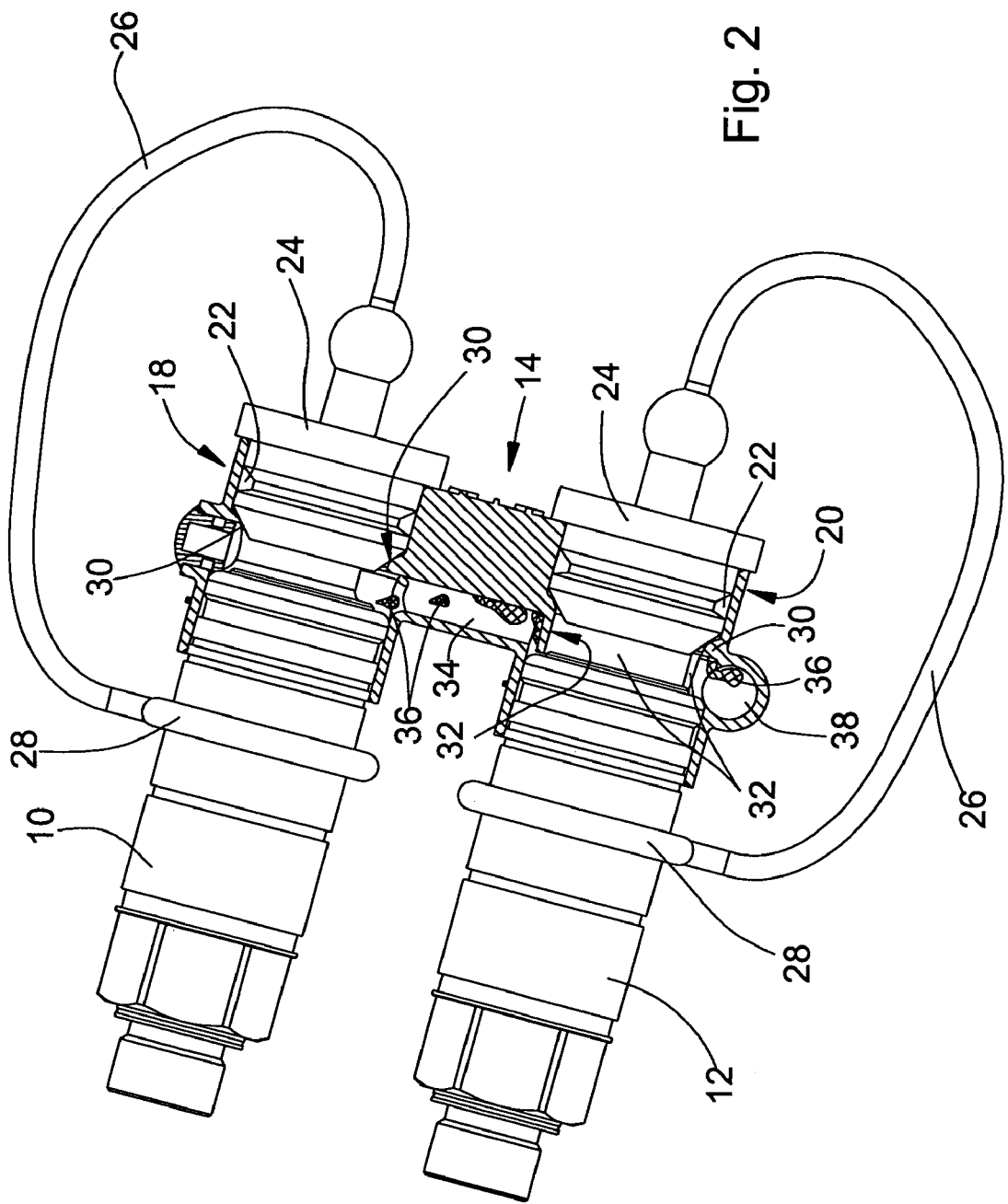
FIG. 2 is a sectional view of the exemplary embodiment of FIG. 1.

FIGS. 1 and 2 show two hydraulic couplings 10 and 12 formed as quick-release connectors, said couplings could be built onto a farm tractor, not shown in the figures. The two hydraulic couplings 10 and 12 are disposed one above the other. The housing structure 14 of the invention is attached to the two hydraulic couplings 10 and 12 with the aid of two attachment means formed as attachment clamps 16. The housing structure 14 comprises an upper housing section 18 and a lower housing section 20. Each housing section 18 and 20 surrounds or seals the hydraulic coupling 10 or 12, allocated to it, from the connecting side of the coupling.

Both the upper and lower housing sections 18 and 20 are each formed substantially cylindrically and have an opening 22 on the side opposite the coupling side of a hydraulic coupling 10 or 12. The opening 22 is reversibly sealable by means of a closing element 24. The closing elements 24 shown in FIGS. 1 and 2 are formed as rubber stoppers. They are made as one piece with a circular part 28 via a connector 26, each also made of rubber, whereby the circular part 28 surrounds the hydraulic coupling 10 or 12 and thus the closing element 24 is assured against being lost.

FIG. 2 shows the housing structure 14 in a cross section along a plane that contains the hydraulic coupling longitudinal axes of the hydraulic couplings 10 and 12. It can be seen in FIG. 2 that both on the upper housing section 18 and on the lower housing section 20 retaining means 30 are provided, with which escape of leaking fluid from the respective opening 22 can be prevented almost totally. The retaining means 30 of the upper housing section 18 is formed by an inwardly directed projection. This projection extends in the form of a ring along the entire perimeter of the interior of the substantially cylindrical housing section 18.

In the lower housing section 20, the retaining means 30 formed as a projection, also extends into the interior of the substantially cylindrical housing section 20 in the perimeterwise direction, but only over a relatively small area on the underside.

As taught by the invention, a conveying means 32 is provided, which also protrudes from the interior wall of the lower housing section 20 or is disposed projecting, but is oriented facing the hydraulic coupling. It has a substantially linear form relative to the central axis of the opening, said form having a collecting function due to the oblique placement of the hydraulic couplings 10 and 12 with regard to the horizontal line. A trough-shaped design of the conveying means 32 would also be conceivable; in this case, it would be expedient to make the trough convex in cross section in relation to the interior wall of the lower housing section 20.

The conveying means 32 in terms of its size is formed larger than, for example, the retaining means 30 of the upper housing section 18. The conveying means 32 also extends in the form of a ring on the interior wall of the lower housing section 20, however, not over the entire perimeter, but only up to the relatively small area on the lower side of the housing section 20, on which the retaining means 30 is provided.

A channel 34, which is formed as a cylindrical tubular section, is provided between the upper and lower housing sections 18 and 20. The channel 34 opens on the upper housing section 18 relative to the longitudinal axis of the hydraulic coupling 10 in an area between the retaining means 30 and the hydraulic coupling 10 end facing the closing element 24. The channel 34 opens in the lower housing section 20 relative to the longitudinal axis of the hydraulic coupling 12 in an area between the conveying means 32 and the hydraulic coupling 12 end facing the closing element 24. Accordingly, the channel 34 connects the lower area of the housing section 18 with the upper area of the housing section 20.

FIG. 2 shows the leaking fluid 36 escaping as drops, from the upper hydraulic coupling 10 and collecting in the lower area of the upper housing section 18. From here, this leaking fluid 36 via channel 34 enters the upper area of the lower housing section 20. The leaking fluid 36 is obstructed by the conveying means 32, on the one hand, from wetting the hydraulic coupling 12 end facing the closing element 24 and, on the other hand, from dripping from the lower opening 22 in the upper middle area of the lower housing section 20. Instead, due to the conveying means 32, the leaking fluid 36 is conveyed laterally on the interior wall of the opening 22 into the lower area of the lower housing section 20, where it is collected in area 38. The leaking fluid 36 collected in area 38 of the housing structure 14 can be conveyed by means of a hose, not shown in the figures, to an external container, also not shown.

The housing structure 14 of the invention is formed in a very advantageous manner as a single piece according to the exemplary embodiment shown in FIGS. 1 and 2 and is sealable with the two closing elements 24. In this respect, the hydraulic couplings 10 and 12 are hereby effectively protected from soiling and escape of leaking fluid 36 is almost totally avoided. The one-piece design of the housing structure 14 permits simple and rapid mounting. Due to the simple servicing of the housing structure 14 of the invention, connection is made easier because the housing structure 14 does not need to be wiped with a cloth.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A housing structure and hydraulic coupling arrangement, the housing structure having at least two housing sections, each of which is provided for covering the hydraulic coupling arrangement, each housing section being substantially cylindrical, the hydraulic coupling arrangement having a first hydraulic coupling disposed above a second hydraulic coupling and a housing section having an opening that is reversibly sealable with a closing element and through which a counterpart of a hydraulic coupling can be inserted to create a hydraulic connection, the housing structure further having an area for collecting leaking fluid, and
   a retaining and conveying structure formed in the shape of a ring and having an inwardly directed projection being arranged along an entire perimeter of an interior of the substantially cylindrical housing section near the hydraulic coupling by which the leaking fluid escaping from the upper hydraulic coupling and located in the housing section allocated to said hydraulic coupling can be taken to the area for collecting leaking fluid.

2. A housing structure according to claim 1, wherein the projection is provided in the lower housing section and the projection is oriented protruding from the housing section and facing the hydraulic coupling.

3. A housing structure according to claim 1, wherein the retaining and conveying structure has a channel in the form of a tubular section, by which the upper housing section can be connected to the lower housing section.

4. A housing structure according to claim 3, wherein the channel opens in the upper housing section into an area between the retaining and conveying structure and the hydraulic coupling.

5. A housing structure according to claim 1, wherein the housing structure is formed as a single piece.

6. A housing structure according to claim 1, wherein the area for collecting the leaking fluid is connected to a container via a hose, and the container is disposed separate from the housing structure.

7. A housing structure according to claim 1, wherein a housing section surrounds a hydraulic coupling at least partially from at least one side.

8. A housing structure according to claim 1, wherein the hydraulic couplings are disposed within the housing with their coupling ends sloping obliquely downward such that a hydraulic coupling longitudinal axis forms an angle between 5 and 25 degrees with the horizontal line.

9. A housing structure according to claim 1, wherein the closing element has a rubber stopper.

* * * * *